(12) United States Patent
Johnson, IV

(10) Patent No.: US 10,041,220 B1
(45) Date of Patent: Aug. 7, 2018

(54) DOG DEBRIS SCOOP

(71) Applicant: Carl A. Johnson, IV, Wisconsin Rapids, WI (US)

(72) Inventor: Carl A. Johnson, IV, Wisconsin Rapids, WI (US)

( * ) Notice: Subject to any disclaimer, the term of this patent is extended or adjusted under 35 U.S.C. 154(b) by 0 days.

(21) Appl. No.: 15/887,600

(22) Filed: Feb. 2, 2018

(51) Int. Cl.
*E01H 1/12* (2006.01)
*A01K 23/00* (2006.01)

(52) U.S. Cl.
CPC ............ *E01H 1/1206* (2013.01); *A01K 23/00* (2013.01); *E01H 2001/1226* (2013.01)

(58) Field of Classification Search
CPC ............ E01H 1/1206; E01H 2001/122; E01H 2001/1226; A01K 23/005; B65B 67/04; B65B 67/1238; B65F 1/1415
USPC ........ 294/1.3, 1.4, 214; 248/99, 101
See application file for complete search history.

(56) References Cited

U.S. PATENT DOCUMENTS

| | | | | |
|---|---|---|---|---|
| 4,312,531 A * | 1/1982 | Cross | ........................ | E01H 1/12 141/108 |
| 4,470,627 A * | 9/1984 | Carroll | ................ | B65B 67/1238 141/108 |
| 4,787,584 A * | 11/1988 | Palmer | ................ | B65B 67/1238 141/108 |
| 4,842,228 A * | 6/1989 | Kasper | ................... | B65F 1/1415 141/316 |
| D333,888 S * | 3/1993 | Visser | ............................ | 294/1.4 |
| 5,382,063 A | 1/1995 | Wesener et al. | | |
| 5,575,520 A * | 11/1996 | Northcutt | ................. | A01K 1/01 141/108 |
| 5,655,739 A * | 8/1997 | Teh-Wah Goo | .... | B65B 67/1233 141/390 |
| D461,027 S | 7/2002 | Gardner | | |
| 6,478,351 B1 * | 11/2002 | Nelson | ................... | E01H 1/1206 15/257.2 |
| 7,131,552 B2 * | 11/2006 | Simonson | ................. | B65F 1/06 220/495.06 |
| D635,310 S | 3/2011 | Jessmon | | |
| 2007/0096483 A1 * | 5/2007 | Binkowski | ............ | E01H 1/1206 294/1.3 |
| 2014/0150397 A1 * | 6/2014 | Palmer | ................ | B65B 67/1238 56/400.11 |

* cited by examiner

*Primary Examiner* — Dean J Kramer
(74) *Attorney, Agent, or Firm* — Donald J. Ersler

(57) ABSTRACT

A dog debris scoop preferably includes a tubular entrance member, a tubular rear member and a carrying ring. The tubular entrance member preferably includes a top wall, two opposing side walls and a bottom wall. A pair of opposing bag slots are formed in the two opposing side walls. A ring projection is formed on an outer surface of the top wall to receive the carrying ring. An inside perimeter of the front rim projection is sized to receive the outside perimeter of the rear rim projection. The pair of opposing retention fingers extend forward from opposing sides of the tubular rear member past a front thereof. An inside distance between opposing inside surfaces of the pair of opposing attachment fingers are sized to receive the tubular entrance member.

9 Claims, 6 Drawing Sheets

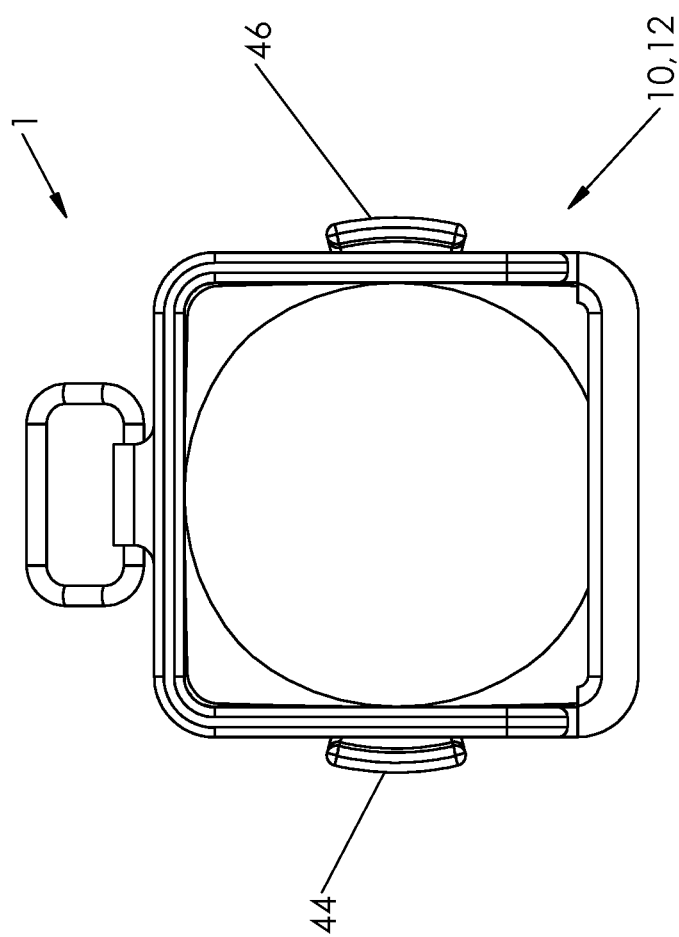

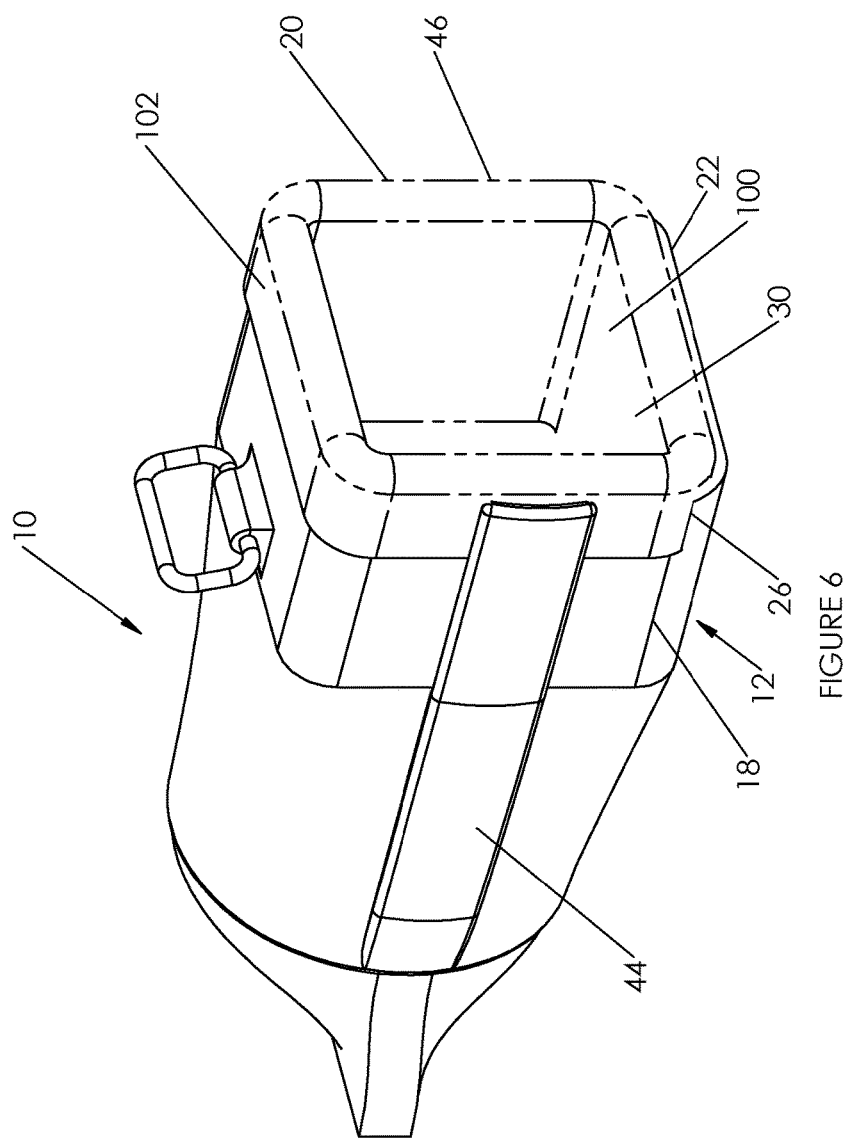

DOG DEBRIS SCOOP

BACKGROUND OF THE INVENTION

1. Field of the Invention

The present invention relates generally to pet clean up and more specifically to a dog debris scoop, which includes a unique pair of fingers and slots for retaining a debris bag.

2. Discussion of the Prior Art

U.S. Pat. No. 5,382,063 to Wesener et al. discloses a waste product collection device. Pat. No. D461027 to Gardner discloses a pet feces collector. Pat. No. D635310 to Jessmon discloses a material scoop adapted for retaining a bag. However, it appears that the prior art does not teach or suggest a dog debris scoop with a unique pair of fingers and slots for retaining a debris bag.

Accordingly, there is a clearly felt need in the art for a dog debris scoop, which includes a unique pair of fingers formed on opposing sides of the dog debris scoop to retain a plastic bag and a pair of opposing bag slots formed at an entrance of the dog debris scoop to retain a bottom of the plastic bag.

SUMMARY OF THE INVENTION

The present invention provides a dog debris scoop, which includes a unique pair of fingers and slots for retaining a plastic bag. The dog debris scoop preferably includes a tubular entrance member, a tubular rear member and a carrying ring. The tubular entrance member preferably includes a top wall, two opposing side walls and a bottom wall. A chamfered edge is formed on a front or entrance to the bottom wall. A pair of opposing bag slots are formed in the two opposing side walls, adjacent an inside surface of the bottom wall to receive a plastic bag, such as a plastic shopping bag or a plastic bread bag. A ring projection is preferably formed on an outer surface of the top wall. The ring projection includes a ring hole to receive the carrying ring. The carrying ring is preferably fabricated from a large diameter wire. The carrying ring includes a split for insertion into the ring hole. A rear rim projection is formed on a perimeter edge of a rear or exit of the tubular entrance member. An outside perimeter of the rear rim projection is smaller than an outside perimeter of the tubular entrance member.

The tubular rear member preferably includes a substantially rectangular shaped entrance, a substantially circular shaped exit and a pair of opposing retention fingers. A front rim projection formed on the entrance to the tubular rear member includes an outside perimeter, which is substantially the same as an outside perimeter of the tubular rear member. An inside perimeter of the front rim projection is sized to receive the outside perimeter of the rear rim projection. The pair of opposing retention fingers extend forward from opposing sides of the tubular rear member past a front thereof. An inside distance between opposing inside surfaces of the pair of opposing attachment fingers are sized to be slightly greater than an outside width of the tubular entrance member. A rear wall could also be formed at the exit of the tubular rear member. The tubular entrance member may be secured to the tubular rear member by applying a bonding agent to the rear rim projection; sonic welding; a snug fit; or any other suitable process. In use, an opening of a plastic bag is folded back to form a folded over portion. The folded over portion is inserted between the two opposing side walls and the pair of opposing retention fingers. A bottom of the folded over portion is pushed into the pair of opposing bag slots. A bottom of the dog debris scoop is placed on the ground pushed toward the dog debris. The chamfered edge pushes the dog debris into the plastic bag. After all the dog debris is removed, the plastic bag may be removed and tied-up for disposal.

Accordingly, it is an object of the present invention to provide a dog debris scoop, which includes a unique pair of fingers formed on opposing sides of the dog debris scoop and a pair of opposing bag slots formed at an entrance of the dog debris scoop to retain a plastic bag.

These and additional objects, advantages, features and benefits of the present invention will become apparent from the following specification.

BRIEF DESCRIPTION OF THE DRAWINGS

FIG. 5 is an end view of a dog debris scoop in accordance with the present invention.

FIG. 6 is a perspective view of a dog debris scoop with a plastic bag retained therein in accordance with the present invention.

DETAILED DESCRIPTION OF THE PREFERRED EMBODIMENTS

Figure 1:
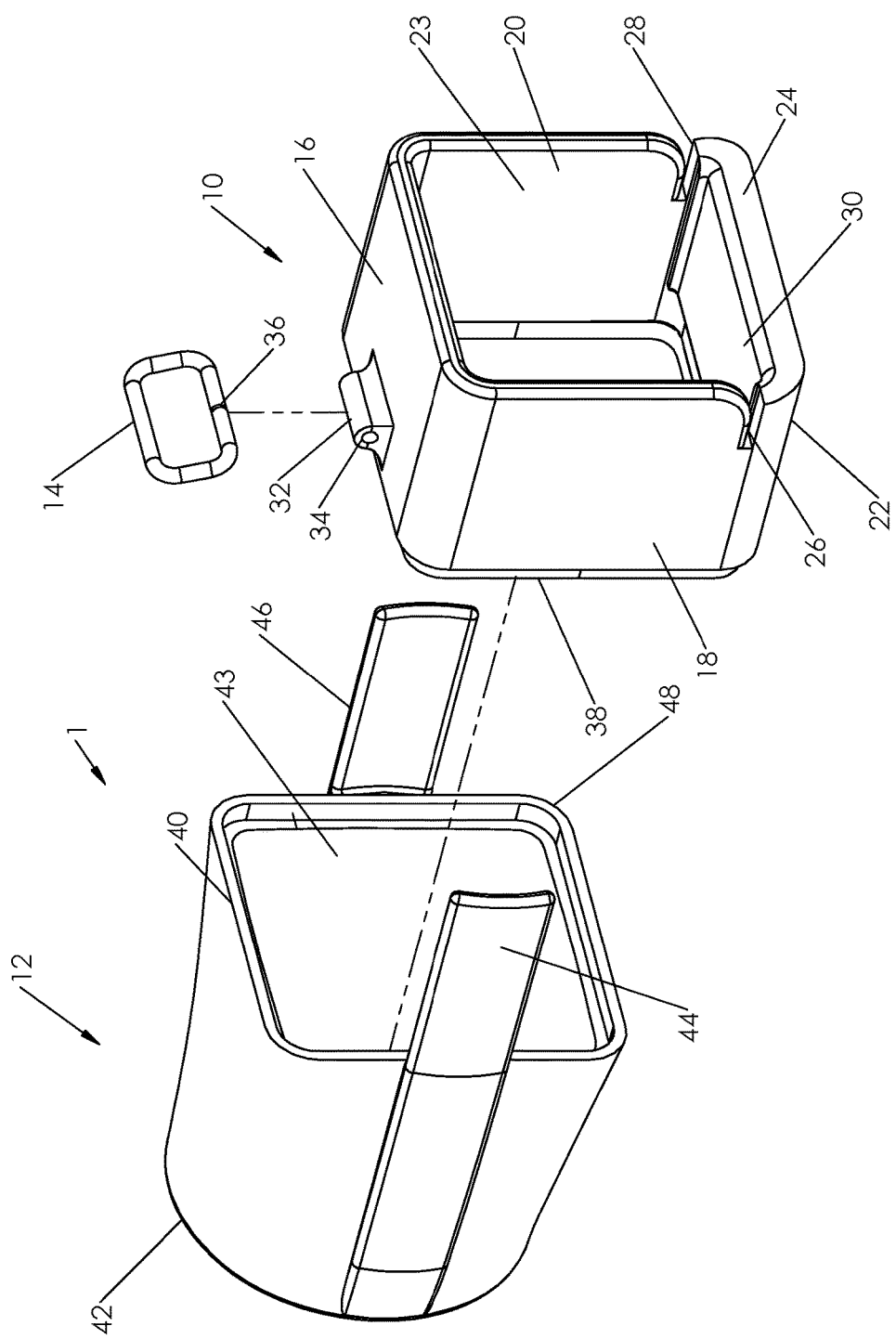
FIG. 1 is an exploded perspective view of a dog debris scoop in accordance with the present invention.
Figure 2:
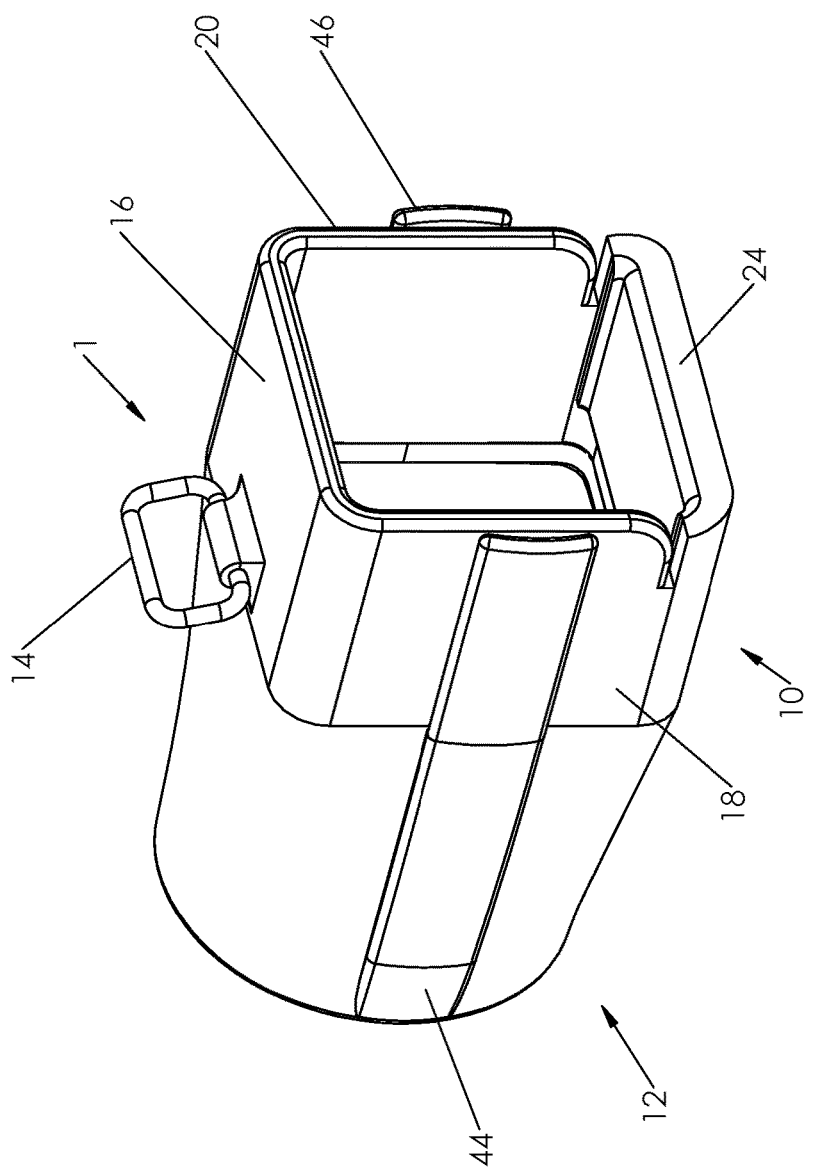
FIG. 2 is a perspective view of a dog debris scoop in accordance with the present invention.
Figure 3:
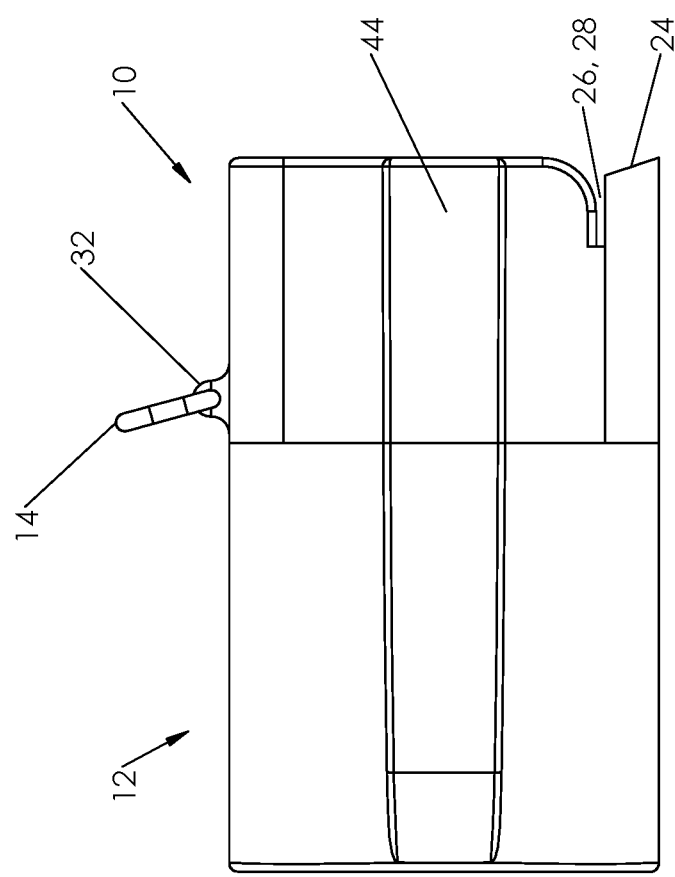
FIG. 3 is a side view of a dog debris scoop in accordance with the present invention.
Figure 4:
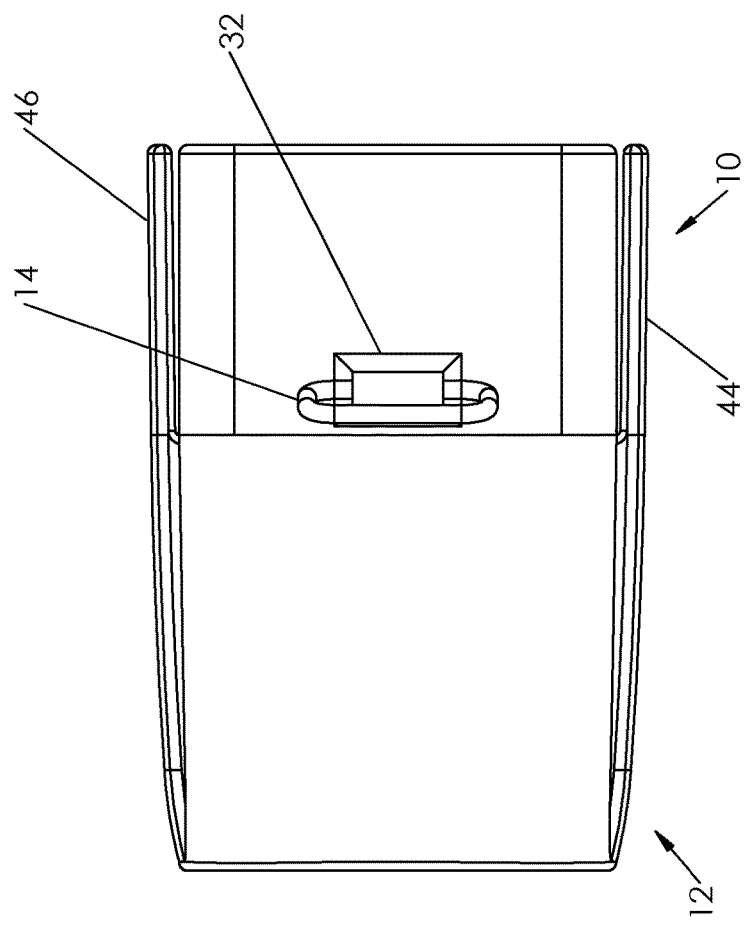
FIG. 4 is a top view of a dog debris scoop in accordance with the present invention.

With reference now to the drawings, and particularly to FIG. 1, there is shown a perspective view of a dog debris scoop 1. With reference to FIGS. 2-5, the dog debris scoop 1 preferably includes a tubular entrance member 10, a tubular rear member 12 and a carrying ring 14. The tubular entrance member 10 preferably includes a top wall 16, two opposing side walls 18, 20, a bottom wall 22 and an entrance inner perimeter 23. A chamfered edge 24 is formed on a front or entrance to the bottom wall 22. With reference to FIG. 6, a pair of opposing bag slots 26, 28 are formed in the two opposing side walls, 18, 20, adjacent an inside surface 30 of the bottom wall 22 to receive a dog debris bag 100, such as a plastic grocery bag or a plastic bread bag. A ring projection 32 is formed on an outer surface of the top wall 16. The ring projection 32 includes a ring hole 34 to receive the carrying ring 14. The carrying ring 14 is preferably fabricated from a large diameter wire. The carrying ring 14 includes a split 36 for insertion into the ring hole 34. However, any other suitable carrying handle may also be used, instead of the carrying ring 14. The carrying handle may extend upward from the tubular entrance member or the tubular rear member. A rear rim projection 38 is formed on a rear or exit of the tubular entrance member 10. An outside perimeter of the rear rim projection 38 is smaller than an outside perimeter of the tubular entrance member 10.

The tubular rear member 12 preferably includes a substantially rectangular shaped entrance 40, a substantially circular shaped exit 42, an inner perimeter 43 and a pair of opposing retention fingers 44, 46. A front rim projection 48 formed on the entrance 40 to the tubular rear member 12 includes an outside perimeter, which is substantially the same as an outside perimeter of the tubular rear member 12.

An inside perimeter of the front rim projection 48 is sized to receive the outside perimeter of the rear rim projection 38. The pair of opposing retention fingers 44, 46 extend forward from opposing sides of the tubular rear member 12, past a front thereof. The pair opposing retention fingers 44, 46 extend to a front of the entrance tubular member 10. An inside distance between opposing inside surfaces of the pair of opposing attachment fingers 44, 46 is sized to be slightly greater than an outside width of the tubular entrance member 10. A rear wall could also be formed at the exit 42 of the tubular rear member 12. The tubular entrance member 10 may be secured to the tubular rear member 12 by applying a bonding agent to the rear rim projection 38; sonic welding; a snug fit; or any other suitable process.

In use, an opening of a plastic bag 100 is folded back to form a folded over portion 102. The folded over portion 102 is inserted between the two opposing side walls 18, 20 and the pair of opposing retention fingers 44, 46 and a bottom of the folded over portion 102 is pushed into the two retention slots 26, 28. A bottom of the dog debris scoop 1 is placed on the ground and pushed toward the dog debris (not shown). The chamfered edge 24 pushes the dog debris into the plastic bag 100. After all the dog debris is removed, the plastic bag 100 may be removed and tied-up for disposal.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A dog debris scoop comprising:
    a tubular entrance member includes an entrance inner perimeter; and
    a tubular rear member includes a rear inner perimeter and a pair of opposing retention fingers, said opposing retention fingers extend forward from opposing sides of said tubular rear member past a front thereof, an inside distance between opposing inside surfaces of said pair of opposing retention fingers are sized to receive an outside width of said tubular entrance member, wherein a folded over portion of a debris bag is retained between an outside perimeter of said tubular entrance member and an inside surface of said pair of opposing retention fingers; and
    said tubular rear member includes a substantially rectangular shaped entrance and a substantially circular shaped exit.

2. The dog debris scoop of claim 1 wherein:
    a rear rim projection is formed on a rear of said tubular entrance member; and
    a front rim projection is formed an entrance to said tubular rear member, said front rim projection is sized to receive said rear rim projection.

3. The dog debris scoop of claim 1 wherein:
    a ring projection is formed on a top of said tubular entrance member, said ring projection includes a ring hole, said ring hole is sized to receive a carrying ring.

4. A dog debris scoop comprising:
    a tubular entrance member includes a top wall, two opposing side walls and a bottom wall, a pair of opposing bag slots are formed in said pair of opposing side walls, adjacent an inside surface of said bottom wall to receive a folded over portion of a debris bag; and
    a tubular rear member includes a rear inner perimeter and a pair of opposing retention fingers, said opposing retention fingers extend forward from opposing sides of said tubular rear member past a front thereof, an inside distance between opposing inside surfaces of said pair of opposing retention fingers are sized to receive an outside width of said tubular entrance member, wherein the folded over portion of the debris bag is retained between an outside perimeter of said tubular entrance member and an inside surface of said pair of opposing retention fingers; and
    said tubular rear member includes a substantially rectangular shaped entrance and a substantially circular shaped exit.

5. The dog debris scoop of claim 4 wherein:
    a rear rim projection is formed on a rear of said tubular entrance member; and
    a front rim projection is formed an entrance to said tubular rear member, said front rim projection is sized to receive said rear rim projection.

6. The dog debris scoop of claim 4 wherein:
    a ring projection is formed on a top of said tubular entrance member, said ring projection includes a ring hole, said ring hole is sized to receive a carrying ring.

7. A dog debris scoop comprising:
    a tubular entrance member includes an entrance inner perimeter;
    a tubular rear member includes a rear inner perimeter and a pair of opposing retention fingers, said opposing retention fingers extend forward from opposing sides of said tubular rear member past a front thereof, an inside distance between opposing inside surfaces of said pair of opposing retention fingers are sized to receive an outside width of said tubular entrance member, wherein a folded over portion of a debris bag is retained between an outside perimeter of said tubular entrance member and an inside surface of said pair of opposing retention fingers,
    said tubular rear member includes a substantially rectangular shaped entrance and a substantially circular shaped exit; and
    a carrying handle extending from at least one of a top of said tubular entrance member and said tubular rear member.

8. The dog debris scoop of claim 7 wherein:
    a rear rim projection is formed on a rear of said tubular entrance member; and
    a front rim projection is formed an entrance to said tubular rear member, said front rim projection is sized to receive said rear rim projection.

9. The dog debris scoop of claim 7 wherein:
    said carrying handle includes a ring projection and a carrying ring retained in said ring projection.

* * * * *